United States Patent [19]
Momchilovich et al.

[11] Patent Number: 5,840,783
[45] Date of Patent: Nov. 24, 1998

[54] PRESSURE-SENSITIVE ADHESIVES FOR POLYOLEFIN SURFACES

[75] Inventors: Bradley S. Momchilovich; Michael A. Johnson, both of Stillwater; Paul Hattam, Woodbury; Mark D. Purgett; Albert I. Everaerts, both of Oakdale; Kevin Kaczorek, Mahtomedi, all of Minn.

[73] Assignee: Minnesota Mining and Manufacturing Company, St. Paul, Minn.

[21] Appl. No.: 749,048

[22] Filed: Nov. 14, 1996

Related U.S. Application Data

[63] Continuation of Ser. No. 427,214, Apr. 24, 1995, abandoned.

[51] Int. Cl.⁶ .................................. C08J 3/28; C09J 3/14
[52] U.S. Cl. .................. 522/412; 525/227; 428/355 AC; 428/356
[58] Field of Search ............................ 428/345, 355 AC, 428/356; 524/458, 481; 522/112; 525/227

[56] References Cited

U.S. PATENT DOCUMENTS

| | | | |
|---|---|---|---|
| Re. 24,906 | 12/1960 | Ulrich | 206/59 |
| 3,926,878 | 12/1975 | Shimizu et al. | 260/27 |
| 4,078,132 | 3/1978 | Lepert | 526/76 |
| 4,113,792 | 9/1978 | Pastor et al. | 260/834 |
| 4,170,612 | 10/1979 | Pastor et al. | 525/101 |
| 4,181,752 | 1/1980 | Martens et al. | 427/54.1 |
| 4,243,500 | 1/1981 | Martens et al. | 204/159.12 |
| 4,329,384 | 5/1982 | Vesley et al. | 428/40 |
| 4,330,590 | 5/1982 | Vesley | 428/336 |
| 4,379,201 | 4/1983 | Heilmann et al. | 428/345 |
| 4,391,687 | 7/1983 | Vesley | 204/159.16 |
| 4,415,615 | 11/1983 | Esmay et al. | 428/40 |
| 4,421,822 | 12/1983 | Levens | 428/343 |
| 4,514,554 | 4/1985 | Hughes et al. | 526/339 |
| 4,554,324 | 11/1985 | Husman et al. | 525/301 |
| 4,564,657 | 1/1986 | Nishikubo et al. | |
| 4,599,260 | 7/1986 | Truskolaski et al. | 428/207 |
| 4,612,052 | 9/1986 | Schwartz | 106/31 |
| 4,619,979 | 10/1986 | Kotnour et al. | 526/88 |
| 4,629,766 | 12/1986 | Malatesta et al. | 525/222 |
| 4,726,982 | 2/1988 | Traynor et al. | 428/213 |
| 4,737,559 | 4/1988 | Kellen et al. | 526/291 |
| 4,818,610 | 4/1989 | Zimmerman et al. | 428/345 |
| 4,880,849 | 11/1989 | Poole et al. | 522/10 |
| 4,894,259 | 1/1990 | Kullen | 427/208.8 |
| 4,895,738 | 1/1990 | Zimmmerman et al. | 427/208.8 |
| 4,943,461 | 7/1990 | Karim | |
| 4,945,003 | 7/1990 | Poole et al. | 428/462 |
| 4,988,742 | 1/1991 | Moon et al. | 522/79 |
| 5,024,880 | 6/1991 | Vesley et al. | |
| 5,028,484 | 7/1991 | Martin et al. | 428/352 |
| 5,079,047 | 1/1992 | Bogaert et al. | |
| 5,164,441 | 11/1992 | Yang | 524/458 |
| 5,202,361 | 4/1993 | Zimmerman et al. | 522/120 |
| 5,244,962 | 9/1993 | Plamthottam et al. | 524/525 |
| 5,264,278 | 11/1993 | Mazurek et al. | |
| 5,308,887 | 5/1994 | Ko et al. | |
| 5,464,659 | 11/1995 | Melancon et al. | |

FOREIGN PATENT DOCUMENTS

| | | |
|---|---|---|
| 0 161 854 | 11/1985 | European Pat. Off. . |
| 0 143 530 | 6/1988 | European Pat. Off. . |
| 344756 | 6/1989 | European Pat. Off. . |
| 0 359 373 | 3/1990 | European Pat. Off. . |
| 0 386 909 | 9/1990 | European Pat. Off. . |
| 0 352 901 B1 | 8/1995 | European Pat. Off. . |
| 2.148.199 | 3/1973 | France . |
| 60 006 733 | 6/1983 | Japan . |
| 60 038 436 | 8/1983 | Japan . |
| 01/234451 | 9/1989 | Japan . |
| 01/242 676 | 9/1989 | Japan . |
| 1 395 379 | 5/1975 | United Kingdom . |
| 2108805 | 10/1979 | United Kingdom . |
| WO 91/07472 | 5/1991 | WIPO . |
| WO 92/20073 | 11/1992 | WIPO . |
| WO 95/12623 | 5/1995 | WIPO . |
| WO 95/13331 | 5/1995 | WIPO . |
| WO 95/16998 | 6/1995 | WIPO . |
| WO 96/11992 | 4/1996 | WIPO . |

OTHER PUBLICATIONS

Eastman Chemical Company, "Chlorinated Polyolefin CP 343–1", Publication GN–362B, Jun. 1994.

*Primary Examiner*—Daniel Zirker
*Attorney, Agent, or Firm*—Gary L. Griswold; Walter N. Kirn; Scott A. Bardell

[57] ABSTRACT

The present invention provides a pressure sensitive adhesive comprising the polymerization reaction product of starting materials comprising:

(a) 50 to 100 parts by weight of at least one acrylic or methacrylic ester of a non-tertiary alkyl alcohol in which the alkyl group contains 4 to 20 carbon atoms;

(b) 0 to 50 parts by weight of at least one reinforcing monomer, copolymerizable with component (a), the sum of (a) and (b) amounting to 100 parts by weight; and (c) 0.1 to 15 parts by weight, per 100 parts by weight of the sum of components (a) and (b), of a substantially soluble chlorinated polyolefin;

said starting materials being substantially solvent-free.

30 Claims, No Drawings

PRESSURE-SENSITIVE ADHESIVES FOR POLYOLEFIN SURFACES

This is a continuation of application Ser. No. 08/427,214 filed Apr. 24, 1995 now abandoned.

FIELD OF THE INVENTION

The invention relates to pressure-sensitive adhesives useful for bonding to low energy surfaces and tapes made with the adhesives.

BACKGROUND OF THE INVENTION

Acrylic pressure-sensitive adhesives are well known in the art for bonding to polar substrates such as metals, painted surfaces, and the like. The preparation of solvent based acrylic pressure-sensitive adhesives is taught in U.S. Pat. No. Re 24,906 (Ulrich). With the environmental impetus to go to substantially solvent-free adhesives, the technology has evolved to pressure-sensitive adhesives prepared with ultraviolet radiation as taught in, for example, U.S. Pat. No. 4,181,752 (Martens et al.). However, newer polymers are being developed as engineering plastics which are non-polar in nature and are difficult to adhere to using conventional pressure-sensitive adhesives. In particular, polypropylene, ethylene-propylene-diene rubbers (EPDM), thermoplastic urethanes (TPU), and thermoplastics olefins (TPOs) which are a blend of polypropylene, polyethylene, and rubber, have been found to be useful materials in automobile construction as body side molding and weather-stripping materials, but are generally difficult to adhere to. In addition, a weatherstrip is often adhered to a surface that may be more polar than itself, pressure-sensitive adhesives formulated for polar surfaces may not work well on the nonpolar surfaces of a weatherstrip.

Tackifying resins have been incorporated into pressure-sensitive adhesives as a means to improve the adhesion of the adhesive to nonpolar substrates. The use of tackifying resins is described in, among other places, U.S. Pat. Nos. 4,988,742 (Moon et al.), 4,726,982 (Traynor et al.), and 5,028,484 (Martin et al.). However, tackified adhesives typically do not have the shear strength needed to perform in some high performance applications, as is required by the automotive industry. In addition, tackified adhesives tend to exhibit loss of adhesion to nonpolar surfaces when exposed to elevated temperatures, i.e., over about 25° C.

Manufacturers have also primed parts with solvent based primers, which are undesirable environmentally, as well as economically because separate priming and drying step are required. Various materials, including chlorinated polyolefins dissolved in solvents, have been used as the base for such primers.

Other techniques of priming, such as corona treating, flame treating, plasma treating, chemical etching, and the like, are also used in the industry. However, these techniques have their own limitations and, again, the use of these techniques involves another processing step.

U.S. Pat. No. 4,880,849 describes the use of a chlorinated polyolefin, in combination with acrylic polymers and solvents, as a radiation cured paint primer.

EP 344,756 describes a method to prime polyolefin products by immersing the object in a low solids solution of chloroparaffin in an aromatic solvent, drying the object, and exposing to ultraviolet radiation to provide a surface having improved adhesion to acrylic paints.

JP 01/242,676 describes solvent-based acrylic pressure-sensitive adhesive compositions with chlorinated polyolefins, and in particular, chlorinated polyethylenes.

GB 2,018,805 describes pressure-sensitive adhesive compositions having a polymer from the group consisting of polyvinylether, polyester, and silicone adhesives, a chlorosulfonated polyethylene, and a polymerizable monomer or unsaturated oligomer. The chlorosulfonated polyethylene is dissolved in a relatively large amount of solvent.

There remains an ongoing need for environmentally friendly pressure-sensitive adhesives that bond well to nonpolar substrates with no decline in adhesion values at elevated temperatures, and preferably also bond well to polar substrates such as metals.

SUMMARY OF THE INVENTION

The invention provides a pressure sensitive adhesive comprising the polymerization reaction product of starting materials comprising:

(a) 50 to 100 parts by weight of at least one acrylic or methacrylic ester of a non-tertiary alkyl alcohol in which the alkyl group contains 4 to 20 carbon atoms;

(b) 0 to 50 parts by weight of at least one reinforcing monomer, copolymerizable with component (a), the sum of (a) and (b) amounting to 100 parts by weight; and (c) 0.1 to 15 parts by weight, per 100 parts by weight of the sum of components (a) and (b), of a substantially soluble chlorinated polyolefin; the starting materials being substantially solvent-free.

Additional features and advantages of the invention will be set forth in the description which follows, and in part will be apparent from the description, or may be learned by practice of the invention. The objectives and other advantages of the invention will be realized and attained by the methods and articles particularly pointed out in the written description and claims hereof It is to be understood that both the foregoing general description and the following detailed description are exemplary and explanatory and are intended to provide further explanation of the invention as claimed.

DETAILED DESCRIPTION OF THE INVENTION

Pressure-sensitive adhesives of the present invention comprise an acrylic polymer and a chlorinated polyolefin and are prepared from a substantially solvent free adhesive composition by a process that does not require the addition of solvent in the preparation of the adhesive. The adhesives are particularly well suited for adhering to nonpolar or low energy substrates, such as olefinic surfaces and some automotive paints, without requiring additional priming of the surface. These adhesives also increase in adhesion strength to these substrates upon room temperature aging. The adhesives also adhere well to more polar substrates such as many conventional automotive paints, steel, stainless steel, and other metal surfaces. Preferred embodiments of the invention also exhibit adhesion build on nonpolar olefinic substrates when tested at elevated temperatures, as compared to typical tackified adhesives which tend to result in lower adhesion after exposure to elevated temperatures.

As used herein, "substantially solvent-free" refers to a pressure-sensitive adhesive that has been prepared without the use of large amounts of solvent, i.e., less than 5 percent by weight of a coating composition, preferably less than about 2 percent, and more preferably no additional solvent is added. The preparation of the pressure-sensitive adhesive includes processes used in the polymerization of the monomers used as the adhesive and in the coating process to make finished articles, e.g., pressure-sensitive adhesive tapes. The term "solvent" refers to conventional organic solvents used in the industry which include, for example, toluene, heptane, ethyl acetate, methyl ethyl ketone, acetone, xylene, tetrahydrofuran, trichloroethylene, and mixtures thereof.

The adhesives of the invention are prepared from pressure-sensitive adhesive compositions comprising from about 50 to 100 parts by weight of at least one acrylic or methacrylic ester of a non-tertiary alkyl alcohol in which the alkyl group contains 4 to 20 carbon atoms; 0 to 50 parts by weight of at least one reinforcing monomer, copolymerizable with component (a), the sum of (a) and (b) amounting to 100 parts by weight; and 0.1 to 15 parts by weight, per 100 parts by weight of the sum of components (a) and (b), of a substantially soluble chlorinated polyolefin. The starting materials are substantially solvent-free.

Monomers useful in the practice of the invention are those which have a homopolymer glass transition temperature less than about 0° C. Preferred alkyl acrylates are unsaturated monofunctional (meth)acrylic acid esters of non-tertiary alkyl alcohols having from 4 to 20 carbon atoms in the alkyl moiety, and more preferably from 4 to 18 carbon atoms. Examples of useful alkyl acrylate monomers include, but are not limited to, n-butyl acrylate, n-hexyl acrylate, n-octyl acrylate, isooctyl acrylate, 2-ethylhexyl acrylate, isononyl acrylate, n-decyl acrylate, n-dodecyl acrylate, octadecyl acrylate, and mixtures thereof.

A monoethylenically unsaturated reinforcing co-monomer having a homopolymer glass transition temperature greater than about 0° C. is preferably co-polymerized with the acrylate monomers. Examples of useful reinforcing co-polymerizable monomers include, but are not limited to, meth(acrylic) acid, N-vinyl pyrrolidone, N-vinyl caprolactam, substituted (meth)acrylamides such as N,N,-dimethyl acrylamides, acrylonitrile, isobornyl acrylate, $C_1$–$C_3$ acrylates, carboxyethyl acrylate, and mixtures thereof In a preferred embodiment, a combination of isobornyl acrylate and acrylic acid is used as co-polymerizable monomers. When a co-polymerizable monomer is used, the alkyl acrylate is present in the composition in amounts from about 50 to 99 parts by weight and the co-polymerizable monomer(s) are present in amounts from 50 to 1 parts by weight, wherein the total amount by weight is 100. As used herein, the word "copolymer" is intended to include terpolymers, tetrapolymers, and the like.

Chlorinated polyolefins that are suitable in the practice of the invention are chlorinated polyolefins which are substantially soluble in the acrylate syrups or monomers. A syrup of the acrylate monomers can be formed by a partial polymerization of the acrylate monomers or by adding thickening agents to a monomer composition. The chlorinated polyolefins can also be added to a monomer mixture, which can then be partially polymerized to form a syrup. Suitable chlorinated polyolefins may be chemically functionalized to affect the solubility and/or to improve the performance of the adhesive. Useful functional groups include, but are not limited to, amine, nitro, acetal, and unsaturated groups, such as vinyl.

As used herein the term "substantially soluble" refers to chlorinated polyolefins which can be dissolved in the above described acrylate monomers or syrups to form a substantially clear to hazy solution which will not separate into layers or form a precipitate when left unagitated for a minimum of 24 hours at room temperature. In a preferred embodiment, the chlorinated polyolefins can be dissolved in the above described acrylate monomers or syrups to form a substantially clear to hazy solution which will not separate into layers or form a precipitate when left unagitated for a minimum of a week at room temperature. The monomers or syrup can be heated, e.g., to about 70° C., to dissolve the chlorinated polyolefin. Agitation on a roller mill at room temperature for 24 hours can also be adequate to dissolve the chlorinated polyolefin. In some instances the monomer or syrup can be heated and then coated at the higher temperature.

The chlorinated polyolefin can be used in amounts from about 0.1 to 15 parts by weight of chlorinated polyolefin per 100 parts of acrylate (pph), i.e., the acrylic acid ester and co-monomer. Preferably, the chlorinated polyolefin is used in amounts ranging from 0.1 to 10 pph, more preferably in amounts ranging from about 0.2 to 7 pph, and most preferably in amounts ranging from about 0.5 to 5 pph.

Preferably, the chlorinated polyolefins have a chlorine content from about 10 percent to 50 percent, and more preferably, from 10 percent to 40 percent. In a highly preferred embodiment, the chlorinated polyolefin is chlorinated polypropylene. Additionally, the chlorinated polypropylene preferably has a chlorine content from about 20 percent to 35 percent.

Examples of suitable chlorinated polyolefins that are commercially available include Eastman®CP 343-1 from Eastman Chemical Products, Inc., Hardlen brand chlorinated polyolefins from Toyo Kasei Kogyo Co., Ltd., and Hypalon™ chlorinated polypropylene, available from DuPont Co.

The compositions of the invention preferably include a polymerization initiator, especially a thermal initiator or photoinitiator, of a type and in an amount effective to polymerize components (a) and (b). In a preferred embodiment, the initiator is a photoinitiator and examples include, but are not limited to, substituted acetophenones such as 2,2-dimethoxy-2-2-phenylacetophenone, benzoin ethers such as benzoin methyl ether, substituted benzoin ethers such as anisoin methyl ether, substituted alpha-ketols such as 2-methyl-2-hydroxypropiophenone, and copolymerizable photoinitiators. Photoinitiators are commercially available from sources such as Ciba Geigy under the Irgacure™ trade designation, such as Irgacure™ 184, Irgacure™ 651, Irgacure™ 369, Irgacure™ 907, and under the Escacure™ trade name from Sartomer.

The photoinitiators can be used in amounts from about 0.001 pph to about 5 pph depending upon the type and molecular weight of the photoinitiator. Generally, lower molecular weight materials are used in amounts of about 0.001 pph to about 2 pph, while higher molecular weight polymeric photoinitiators are used in amounts from about 0.1 pph to about 5 pph.

The pressure-sensitive adhesives can also be cross-linked to provide greater shear strength. Useful cross-linking agents include multifunctional acrylates, such as those disclosed in U.S. Pat. No. 4,379,201 (Heilman), which include but are not limited to 1,6-hexanediol diacrylate, trimethylolpropane triacrylate, 1,2-ethylene glycol diacrylate, pentaerythritol tetracrylate, and mixtures thereof, co-polymerizable aromatic ketone comonomers such as those disclosed in U.S. Pat. No. 4,737,559 (Kellen), photoactive triazines such as those disclosed in U.S. Pat. Nos. 4,329,384 (Vesley et al.), 4,330,590 (Vesley), and 4,391,687 (Vesley), organosilanes, benzophenones, and isocyanates.

The cross-linking agents are included in amounts from about 0.002 pph (parts per 100 parts of acrylate monomers, i.e., the alkyl acrylate and the optional co-monomer) to about 2 pph, and preferably from about 0.01 pph to about 0.5 pph. The amount used will depend upon the amount of functionality and molecular weight of the cross-linking agent, and the desired properties of the adhesive.

Physical cross-linking agents such as copolymerizable macromonomers disclosed in U.S. Pat. No. 4,554,324 (Husman et al.), incorporated herein by reference, can also be used. Useful amounts of macromonomers range from about 1 pph to about 20 pph, and preferably from about 2 pph to about 10 pph.

Preferably, the pressure-sensitive adhesives also include a tackifying resin, i.e., tackifier. A wide variety of tackifying resins can be used. Such resins include hydrocarbon resins, hydrogenated hydrocarbon resins, phenol modified terpenes, poly-(t-butyl) styrene, rosin esters, vinyl cyclohexane, and the like. Suitable tackifying resins are commercially available and include, for example, those sold under the Regalrez™ and Foral™ trade designations from Hercules, such as Regalrez™1085, Regalrez™1094, Regalrez™6108, Regalrez™3102, and Foral™85.

Also useful are water white, hydrogenated, aromatic hydrocarbon tackifying resins having a retained aromaticity greater than 50 percent, preferably greater than 70 percent, and more preferably greater than 80 percent, based on the amount of monomer in the feedstock. A preferred range for retained aromaticity is 70 to 95 percent, more preferably 80 to 95 percent.

The water white tackifying resins have a Z-average molecular weight ranging from about 500 to 1800, preferably between about 600 and 1500, and most preferably from about 650 to 1200. In a highly preferred embodiment of the invention, the tackifying resin has a Z-average molecular weight between about 700 and 1100. The Z-average molecular weight is further preferred to be less than 1500, more preferably less than 1200, and more preferably less than 1000.

The tackifying resins also have a narrow molecular weight distribution with a polydispersity (Mw/Mn) of less than 2.5, preferably less than about 2.1, and most preferably less than 1.9. The molecular weight characterizations are determined by gel permeation chromatography using a polystyrene calibration basis and then converting to a polyisobutylene calibration basis according to the following equation:

$$\log (Mw_{polyisobutylene}) = 1.1 \times \log (Mw_{polystyrene}) - 0.517 \tag{1}$$

The procedure is described in detail in WO-A-91-07472 (Luvinh), which is hereby incorporated by reference.

The softening points (Ring and Ball softening points as determined by ASTM E-28) of these tackifying resins typically fall within the range of about 40° C. to about 120° C., and preferably from about 65° C. to about 100° C.

After hydrogenation, the resins are water white. A "water white" resin is defined to be a resin having a molten Gardner color of less than about 2. An especially preferred resin has a molten Gardner color of less than 1.

The resin also preferably exhibits an initial color after hydrogenation of greater than 24 Saybolt (10% solution of toluene).

The water white tackifying resins are hydrogenated petroleum hydrocarbon resins that may be produced by catalytic polymerization of principally aromatic monomers. After polymerization and hydrogenation, these aromatic monomers retain at least 20% aromatic protons as determined by nuclear magnetic resonance (NMR), and preferably at least 24% aromatic protons. The aromaticity is measured by proton NMR ($^1$H-NMR) analysis by generally accepted procedures. The "retained aromaticity" is the ratio of the aromaticity by proton NMR of the hydrogenated resin to that of the polymerized resin prior to hydrogenation. The procedure is described in detail in WO-A-91-07472 (Luvinh).

A preferred water white tackifying resin is produced from a hydrocarbon feedstock and has (i) a retained aromaticity on a weight percent of monomers in the feedstock basis of greater than 50 percent; (ii) a softening point of 65° to 120° C.; (iii) a Mz of less than 1800; and (iv) substantially no molecular weight fractions above 7000. A more preferred water white tackifying resin has a softening point from 65° to 100° C.

The water white tackifying resins can be prepared by the following procedure:

(a) polymerizing under Friedel-Crafts polymerization conditions steam cracked distillates, or fractions thereof, having boiling points between about 135° C. and 220° C., and containing at least 40% by weight vinyl aromatic monomer contents, in the presence of 0 to 40% by weight of the polymerization mixture of a chain transfer agent; and (b) catalytically hydrogenating the results of (a) such that at least 75% of the aromaticity is retained.

The water white tackifying resins are preferably prepared by catalytic polymerization of petroleum fractions identified as Heartcut Distillates, or HCD, and 0 to 40% by weight of a chain transfer agent. The resins are typically prepared from vinyl aromatic streams comprising the following components:

| Components | Typical Range | Typical Heartcut Distillate |
| --- | --- | --- |
| Styrene | 1–15 | 8 |
| Alkyl derivatives of styrene | 15–40 | 25 |
| Indene | 5–20 | 10 |
| Alkyl derivatives of indene | 3–15 | 10 |
| Non-reactive components | 15–76 | 47 |

Such streams can be derived from the steam-cracked petroleum distillates or fractions thereof, having boiling points between about 135° C. and 220° C. so long as they contain or are modified to contain sufficient vinyl aromatic contents. For example, an essentially pure styrene component can be added to commercially available petroleum distillate products that fit this description except for styrene. In this manner, a vinyl aromatic stream comprising, by weight percent, 11.4% styrene, 31.6% alkyl derivatives of styrene, 17.1% indene, 5% alkyl derivatives of indene, and 34.9% non-reactive components, was confirmed to be a suitable resin feedstock.

Polymerization of the hydrocarbon resin is generally accomplished according to the teachings of U.S. Pat. No. 4,078,132 (Lepert), incorporated herein by reference. According to this teaching, branched chain aliphatic olefins are introduced during polymerization as chain transfer agents to achieve both lowered softening point and narrowed molecular weight distribution. Although this document addresses the preparation of substantially non-aromatic unsaturated thermoplastic resins, the teaching therein is applicable to feed streams comprising heartcut distillates or feed streams comprising vinyl aromatic monomer(s) to yield a highly aromatic precursor resin, which when hydrogenated, can yield the aromatic tackifier resin described herein. The feed streams should contain at least 40%, by weight of total polymerizable monomers, of vinyl aromatic monomers, and preferably at least 50%.

The polymerization process of U.S. Pat. No. 4,078,132 is particularly suitable when practiced at polymerization temperatures between −20° C. and 100° C., and preferably between 30° C. and 80° C., in the presence of a Friedel-Crafts catalyst such as aluminum chloride ($AlCl_3$) and in the presence of the branched chain reactive olefin chain transfer agents, which are preferably isoamylenes, dimates, or mixtures thereof. Most of the branched chain reactive olefin compounds will be effective when used in the proper amounts as described in U.S. Pat. No. 4,078,132. Some compounds, such as isoamylenes, are more reactive and can be advantageously used in smaller amounts to control the softening point and molecular weight distribution. Useful amounts of the reactive chain transfer agents are typically in the range of 10 to 20% by weight based on the total weight of the heartcut distillate or vinyl aromatic feed stream, and preferably in the range of 10 to 15%. The process conditions described in U.S. Pat. No. 4,514,554 (Hughes et al.), incorporated herein by reference, also include a description of the polymerization of petroleum fraction feedstocks including isoamylenes.

Hydrogenation can generally be accomplished according to the teachings in U.S. Pat. No. 4,629,766 (Malatesta et al.), incorporated herein by reference, but other conventional means of hydrogenation may also be used. Typically, temperatures of 200° C. to 300° C. at pressures of 10 to 300 $kg/cm^2$, and hydrogenating or hydrotreating catalysts such Group VIII metals such as nickel, palladium, cobalt, ruthenium, platinum, and rhodium, Group VI metals such as tungsten, chromium and molybdenum, and Group VII metals such as manganese and copper, are used. These metals may be used alone or in combination of two or more metals, in the metallic form, or in an activated form, and may be used directly or on a solid support such as alumina or silica-alumina. A preferred catalyst is one comprising sulfided nickel-tungsten on a gamma-alumina support having a fresh catalyst surface area ranging from 120 to 300 $meters^2/$ gram, and containing 2 to 10% by weight nickel and 10 to 25% by weight tungsten as described in U.S. Pat. No. 4,629,766. The hydrogenation is typically carried out with a hydrogen pressure of 20 to 300 atmospheres ($2.03\times10^5$ to $3.09\times10^7$ Newtons per square meter), and preferably 150 to 250 atmospheres ($1.52\times10^7$ to $2.53\times10^7$ Newtons per square meter. Additional description of hydrogenation of aromatic resins is described in U.S. Pat. No. 3,926,878 and WO-A-91/07472.

Hydrogenation is preferably performed at temperatures, pressures and times with the effective catalysts so as to retain at least 75% aromaticity, preferably at least 80%, more preferably at least 85%, and most preferably, at least 90%. Optimization of the hydrogenation process can be empirically accomplished according to the above described process.

When used, the tackifying resins are used in amounts from about 1 to 50 pph, and preferably from about 4 to 25 pph.

In a preferred practice of the invention, the chlorinated polyolefin is dissolved in the acrylate monomers or an acrylic syrup without the use of solvent. As used herein a syrup refers to a mixture of photocurable materials that has been thickened to a coatable viscosity, i.e., preferably between about 300 and 10,000 centipoise or higher depending upon the coating method used, and include mixtures in which the monomers are partially polymerized to form the syrup, and monomeric mixtures which have been thickened with fillers such as silicas and the like. The chlorinated polyolefin can be added to the mixture either before or after the syrup is made. Preferably, the syrups of the invention are formed by partial polymerization of the monomers by free radical initiators which are known in the art and can be activated by thermal energy or radiation such as ultraviolet light. An effective amount of at least one free radical initiator, preferably a photoinitiator, is added to the acrylate monomers or syrup containing the chlorinated polyolefin. The mixture is then coated onto a substrate such as a polyester film, which may optionally be coated with a release coating, and exposed to ultraviolet radiation in a nitrogen rich atmosphere to form a pressure-sensitive adhesive. Alternatively, oxygen may be excluded by overlaying the coated adhesive with a second release coated film that is sufficiently transparent to ultraviolet radiation to permit curing of the adhesive composition. Preferably the ultraviolet radiation is provided by lamps having a majority of their emission spectra between about 280 and 400 nanometers (nm), with a peak emission at about 350 nm and an intensity less than about 20 milliWatts/square centimeter ($mW/cm^2$). Subsequent exposure of the adhesive to a second source of energy can be used to cross-link or further cure the adhesive. Such sources of energy include heat, electron beam, gamma radiation, and high intensity ultraviolet lamps, such as mercury arc lamps.

In an alternative embodiment, the adhesive composition uses a thermally activated initiator. Suitable thermal free radical initiators are commercially available such as those available from DuPont Company under the VAZO trade designation. Specific examples include Vazo™64 (2,2'-azobis(isobutyroniltrile)) and Vazo™52 initiators. Suitable initiators also include hydroperoxides, such as tert-butyl hydroperoxide, and peroxides, such as benzoyl peroxide and cyclohexane peroxide. The composition can be coated onto a release treated film, covered with a second release treated fiIn, and the composite is placed in a heat transfer fluid and heated to a temperature sufficient to effect polymerization.

Other adjuvants can be included in the composition in amounts needed to effect the desired properties as long as they do not significantly deteriorate the desired end properties of the adhesive. Useful adjuvants include dyes, pigments, silica, fibers, glass or polymeric beads, polymeric particles, thermally conductive particles, and electrically conductive particles.

It is unexpected that chlorinated polyolefins can be incorporated into acrylic adhesives without the use of a solvent because the literature generally teaches that the chlorinated polyolefins are first dissolved in an organic solvent such as toluene, ethyl acetate, and the like, before adding to a formulation. The amount of solvent that is used is often substantial. The chlorinated polyolefin is typically dissolved in the solvent at around 5 to 50% solids, with the remainder being solvent, i.e., about 50 to 95% solvent. The known chlorinated polyolefins are also not particularly compatible with acrylic materials as shown in a technical brochure, "Chlorinated Polyolefin CP 343-1" from Eastman Chemical Co., dated June 1994.

The pressure-sensitive adhesives can be supplied as adhesive transfer tapes in which the adhesive mass is provided in strip form on a release liner, a double coated tape in which a carrier layer is interposed between two layers of adhesive, or as a pressure sensitive adhesive tape in which the adhesive is provided on a permanent backing. Release liners include, for example, paper, polymeric films, woven or nonwoven fabrics which have been treated on at least one major surface, and preferably on both major surfaces, with a release agent such as silicone, perfluoropolyether, TEFLON™, and the like. Permanent tape backings include, but are not limited to paper, foamed sheets such as acrylic foams, polyethylene foams, polyurethane foams, foamed polystyrene, polymeric films such as those made from polyester, polypropylene, plasticized vinyl, polyethylene, ultrahigh molecular weight polyolefins, and natural and synthetic rubbers, and sheets, metal foils, and woven and nonwoven fabrics. Carrier layers for double coated tapes include those useful for permanent tape backings and may have different adhesives on each side of the tape. For example, the pressure-sensitive adhesive of the invention is disposed on one side of the carrier layer, and a second adhesive is disposed on the other side of the carrier layer. The second adhesive may be the same or a different type of adhesive, e.g., acrylic, ethylene vinyl acetate, synthetic rubber, natural rubber, or silicone pressure-sensitive adhesive, a hot melt or a thermosettable adhesive. Preferred foam carrier layers include acrylic foams, closed-cell polyurethane foams, closed-cell polyethylene foams, and ethylene vinyl acetate modified polyethylene foams.

The adhesives of the invention can be laminated to the permanent backings or the carrier layers, or the adhesive composition can be coated directly onto the permanent backing or carrier layer and cured in situ.

Alternatively, tapes using the pressure-sensitive adhesives of the invention can also be formed into multiple layer tapes by methods such as those disclosed in U.S. Pat. Nos. 4,894,259 (Kuller), 4,818,610 (Zimmerman et al.), and 4,895,738 (Zimmerman et al).

Where a foam-like pressure-sensitive adhesive tape is desired, the monomers or syrup may include microspheres. Useful microspheres can have a size ranging from about 5 to 200 micrometers in diameter, and preferably from about 10 to 80 micrometers. Suitable commercially available microspheres include expandable microspheres sold under the trade name "Expancel" from Kema Nord Plastics and those sold under the trade name "Micropearl" from Matsumoto Yushi Seiyaku. The microspheres expand upon heating and can be incorporated into the adhesive composition in the expanded form, or added in unexpanded form to the adhesive composition and subsequently heated, to provide a foamlike tape. Glass or ceramic microspheres can also be used. Useful amounts of microspheres range from about 2 percent to about 75 percent by volume of the pressure-sensitive adhesive composition.

A foam-like tape can also be provided by frothing the pressure-sensitive adhesive composition as taught in U.S. Pat. No. 4,415,615 (Esmay et al.), incorporated herein by reference. Alternatively, the tape can be prepared by laminating the tape of the invention to a foam-like tape taught in U.S. Pat. No. 4,415,615.

The pressure-sensitive adhesives of the invention preferably exhibit adhesion build to a thermoplastic olefin surface at room temperature. The pressure-sensitive adhesives of the invention more preferably exhibit adhesion build to a thermoplastic olefin surface at 70° C. The pressure-sensitive adhesives of the invention are preferably clear and essentially colorless.

The invention also provides a method for adhering a first substrate to a second substrate comprising applying the pressure-sensitive adhesives described above to the first substrate and second substrate. In a preferred embodiment at least one substrate is a thermoplastic olefin polymer.

The invention also provides a method for producing a pressure-sensitive adhesive comprising providing starting materials comprising:

(a) 50 to 100 parts by weight of at least one acrylic or methacrylic ester of a non-tertiary alkyl alcohol in which the alkyl group contains 2 to 20 carbon atoms;

(b) 0 to 50 parts by weight of at least one reinforcing monomer, copolymerizable with component (a), the sum of (a) and (b) amounting to 100 parts by weight; and (c) 0.1 to 15 parts by weight, per 100 parts by weight of the sum of components (a) and (b), of a substantially soluble chlorinated polyolefin;

the starting materials being substantially solvent-free; and polymerizing the starting materials.

The adhesives of the invention are useful for adhering well to a variety of different surfaces including low energy surfaces such as thermoplastic olefins, thermoset olefins, weatherstripping, automotive body side moldings, automotive paint surfaces, thermoplastic urethanes, other plastic surfaces, and metals.

The following non-limiting examples serve to further illustrate specific embodiments of the invention.

Test Methods

Shear Strength

A 1.27 cm by 2.54 cm strip of pressure-sensitive tape is laminated to a 20 mil (0.051 mm) thick anodized aluminum panel measuring about 2.54 cm by 5.08 cm. A second panel of the same size is placed over the tape so that there is a 2.54 cm overlap on top of the adhesive, and the ends of the panels extend oppositely from each other. The sample is then rolled down with a 6.8 kg steel roller so that the total contact area of the adhesive between the panels was 1.27 cm by 2.54 cm. The substrates used for the second panel were either stainless steel (SS), or a painted panel indicating the paint type as described below in the peel adhesion test, or thermoplastic polyolefin (ETA-3 131 TPO from Himont). The TPO surface was wiped once with a 50/50 mixture of isopropanol/water. The prepared panel is allowed to dwell at room temperature, i.e., about 21° C. for at least 1 hour. The panel is then placed in a 70° C. oven and positioned 2° from the vertical to prevent a peel mode failure, and a weight is hung on the free end of the sample. The time required for the weighted sample to fall off of the panel is recorded in minutes. If no failure has occurred within 10,000 minutes, the test is discontinued and results are recorded as 10,000 minutes.

90° Peel Adhesion

The pressure-sensitive adhesive sheet or tape is laminated to a sheet of 5 mil (0.127 mm) thick anodized aluminum. A strip of tape measuring 1.27 cm by 11.4 cm is cut from the sheet and applied to a test substrate. Test substrates used were ETA-3131 Thermoplastic olefin from Himont (TPO), wiped once with a 50/50 mixture of isopropanol/water, polypropylene (PP), or a metal panel painted with a basecoat/clear coat automotive paint composition from DuPont Co. (RK8010).

The strip is then rolled down using four total passes using a 6.8 kg metal roller. The sample is then aged at the following conditions before testing:

20 Min RT—20 minutes at room temperature

3 Days RT—3 days (72 hours) at room temperature

7 Days 70° C.—7 days at 70° C.

When the samples were aged at 70° C., the samples were cooled to room temperature before testing. After aging, the panel is mounted in an Instron™Tensile Tester so that the tape is pulled off at a 90° angle at a speed of 30.5 cm per minute and/or at a speed of 1.27 cm per minute. Results are determined in pounds per 0.5 inch, and converted to Newtons per decimeter (N/dm).

CHLORINATED POLYOLEFINS

CP 343-1—Polypropylene with a chlorine content of 18–22% and a weight average molecular weight (Mw) between about 9,000–12,000—supplied by Eastman Chemical Co.

17-LP—Polypropylene with a chlorine content of about 34–36% and molecular weight of about 115,000—supplied by Toyo Kasei Kogyo Co., Ltd.

16-LP—Polypropylene with a chlorine content of about 31–33% and molecular weight of about 115,000—supplied by Toyo Kasei Kogyo Co., Ltd.

15-LP—Polypropylene with a chlorine content of about 29–31% and molecular weight of about 115,000—supplied by Toyo Kasei Kogyo Co., Ltd.

13-LP—Polypropylene base with a chlorine content of about 25–27% and molecular weight of about 120,000—supplied by Toyo Kasei Kogyo Co., Ltd.

Hypalon™CP 827B—Polypropylene with a chlorine content of about 30% and Mw of about 10,000—supplied by DuPont Co.

Hypalon™CP 163—Ethylene/vinyl acetate copolymer with a chlorine content of about 52%, a vinyl acetate content of 6%,—supplied by DuPont Co.

Hypalon™CP 183—Ethylene/vinyl acetate copolymer with a chlorine content of about 58%, a vinyl acetate content of 7%, —supplied by DuPont Co.

Tyrin™CPE 4211P—Polyethylene with about 42% chlorine—supplied by Dow Chemical Co.

Tyrin™CPE 3623A—Polyethylene with about 36% chlorine—supplied by Dow Chemical Co.

Tyrin™CPE 3615P—Polyethylene with about 36% chlorine—supplied by Dow Chemical Co.

TACKIFYING RESINS

Hydrocarbon Tackifying Resin I

Hydrocarbon Tackifying Resin I, an aromatic hydrogenated hydrocarbon tackifying resin was prepared according to the above disclosure, and characterized by the properties shown below in Table 1.

TABLE 1

Hydrocarbon Tackifying Resin I Properties

| | |
|---|---|
| Softening Point | 98 C. |
| Gel Permeation Chromatography Molecular Weight | |
| MW (Weight Average) | 520 |
| Mn (Number Average) | 330 |
| Mw/Mn (Polydispersity) | 1.6 |
| Mz (Z-average) | 900 |
| Aromaticity (1), % | 27 |
| Glass Transition Temperature (DSC midpoint) | 51 C. |
| Saybolt Color (10% solution) | 28 |
| Aged Gardener Color (50% solution), 5 hrs at 175 C. | 5 |
| Molten Gardner Color | <1 |
| Wax Cloud Point (2) | 70 C. |
| Volatility, weight percent (5 hrs at 175 C.) | 1.2 |

(1) % aromatic protons (about 95% on an aromatic monomer basis
(2) 20 Escorene EVA UL7750, 40 resin, 40 paraffin wax (65 C. MP)

Regalrez™1085—an aromatic hydrocarbon resin with a styrene/vinyl toluene composition in a ratio of 1:7.7, 97% hydrogenated, 18% tertiary hydrogens, Tg=38C, Mn=610, Mw=780, Mz=1010, Mw/Mn=1.28 (available from Hercules, Inc.)

Regalrez™3102—an aromatic hydrocarbon resin with a styrene/α-methyl styrene composition in a ratio of 2.6:1, 34% hydrogenated, 10% tertiary hydrogens, Tg=54C, Mn=780, Mw=1210, Mz=1810, Mw/Mn=1.56 (available from Hercules, Inc.)

Foral™85—rosin ester (available from Hercules, Inc.)

Arakawa KE311—(available from Arakawa Chemical)

EXAMPLE 1

A composition was prepared by mixing 68 parts isooctyl acrylate (IOA), 28 parts isobornyl acrylate (IBA), 4 parts acrylic acid (AA), and 0.04 pph benzil dimethyl ketal photoinitiator (Escacure™KB-1 available from Sartomer Co.) in a closed glass container. The container was purged with nitrogen, and as the nitrogen purging continued, the composition was irradiated with an ultraviolet black light (GE F15T8 BL from General Electric Co.) which was partially taped with black tape to provide an intensity of about 0.15 milliwatts per square centimeter (mW/cm$^2$), measured according to the industry standard G unit, to form a syrup having a coatable viscosity estimated to be about 3000 centipoise. To the syrup was added 1 pph chlorinated polyolefin (CP343-1 available from Eastman Chemical Co.), and the mixture was heated at about 70° C. for about 30 minutes and cooled to room temperature to form a stable, slightly hazy syrup. The following were then added to the syrup and mixed until all of the components were dissolved: 7 pph hydrocarbon tackifier (Regalrez™1085), an additional 0.16 part benzil dimethyl ketal, and 0.1 pph 2,4-bis (trichloromethyl)-6-(4-methyoxyphenyl)-s-triazine. After mixing, the mixture was knife coated to a thickness of about 0.076 millimeters onto a polyester film that had been coated with a silicone release coating, and then exposed to fluorescent black lamps in a nitrogen rich atmosphere (50 ppm oxygen) for 5 minutes to form a pressure-sensitive adhesive transfer tape. The intensity was 1.5 milliWatts/square centimeter (mW/cm$^2$) for 1.7 minutes and 4.2 mW/cm$^2$ for 3.3 minutes, measured according to the National Institute Standards units (NIST units). The fluorescent black lamps had about 90% of their emission spectra between about 300 and 400 nanometers (nm), with a peak emission at about 350 nm.

A foam sheet material was prepared as taught in U.S. Pat. No. 4,415,615 (Esmay et al.) using a mixture of 87.5 parts IOA, 12.5 parts AA, and 0.04 parts benzil dimethyl ketal to make a syrup as described above. To the syrup was added an additional 0.1 part benzil dimethyl ketal, 2.0 part hydrophobic silica (R-972 available from DeGussa), and 8 parts glass microbubbles (C15-250 available from Minnesota Mining & Manufacturing Co.). The composition was frothed with nitrogen and 1–2 pph of a 60/40 mixture of Surfactant B/Surfactant C of U.S. Pat. No. 4,415,615 (Esmay et al.) and then coated to a thickness of about 1 millimeter and cured to form a sheet material. The sheet material was then coated with a 10% solids solution of a polyamide resin (Macromelt 6240 from Henkel, Inc.) in a solvent blend having 50 parts isopropanol and 50 parts n-propanol and dried in an oven at 121° C. for 15 minutes. The pressure-sensitive adhesive transfer tape was then heat laminated to the coating.

The pressure-sensitive adhesive coated sheet material was tested according to the above described procedures for 90° Peel Adhesion with the inventive pressure-sensitive adhesive surface against the TPO or stainless steel, and results are shown in Table 3. The amount of volatiles (Vol) is also noted.

EXAMPLES 2–7 and C1–C4

Examples 2–4 and C1–C4 were prepared as in Example 1 except that different chlorinated polyolefins were used as shown in Table 2. Example 5 was prepared as in Example 1 except that no tackifying resin was used. The solubility (Sol) of the chlorinated polyolefin in the acrylate syrup is also characterized in Table 2 as substantially soluble in and forming a substantially clear solution (yes), substantially soluble and forming a hazy solution (mod), and insoluble (no). Samples in which the chlorinated polyolefins were not soluble were not coated.

TABLE 2

| Ex | Chlorinated | Sol | 90° Peel Adhesion - 30.48 cm/min - TPO - N/dm | | | Static Shear - 70 C. - 250 g weight - Min. | |
|---|---|---|---|---|---|---|---|
| | | | 20 min | 3 day | 7 day | TPO | SS |
| | Polyolefin | | RT | RT | 70 C. | | |
| 1 | CP-343-1 | yes | 74 | 500 | 613 | 10000 | 10000 |
| 1* | CP-343-1 | yes | 144* | 385* | 606* | 10000* | 10000 |
| 2 | LP-17 | yes | 63 | 536 | 644 | 1805 | 10000 |
| 3 | LP-13 | mod | 63 | 399 | 637 | 1693 | 10000 |
| 4 | Hypalon ™ 827-B | yes | 66 | 385 | 623 | 10000 | 10000 |
| 5 | CP-343-1 | yes | 77 | 270 | 560 | 8560 | 10000 |
| 6 | Hypalon ™ CP-163 | mod | 74 | 154 | 77 | 1501 | 10000 |
| 7 | Hypalon ™ CP-183 | mod | 67 | 536 | 74 | 2022 | 10000 |
| C1 | Tyrin ™ CPE 3615 P | no | — | — | — | — | — |
| C2 | Tyrin ™ CPE 3623 P | no | — | — | — | — | — |
| C3 | Tyrin ™ CPE 4211 P | no | — | — | — | — | — |
| C4 | None | — | 70 | 522 | 84 | 861 | 10000 |

*Example 1 was tested on RK 8010 paint.

The data in Table 2 show that preferred embodiments of the invention exhibit an increase in adhesion to an olefinic substrate after heat aging.

EXAMPLES 8–12

Pressure sensitive adhesive sheet materials were prepared as in Example 1 except that the tackifying resin was used in an amount of 4 pph, and various tackifying resins were used according to Table 3.

TABLE 3

| | 90° Peel Adhesion - TPO - N/dm | | | Static Shear - 70 C. - 250 g weight |
|---|---|---|---|---|
| | 20 min | 3 day | 7 day | |
| Ex Tackifying Resin | RT | RT | 70 C. | TPO - min |
| 8 Hydrocarbon Tackifying Resin I | 60 | 406 | 718 | 10000 |
| 9 Regalrez ™ 1085 | 74 | 459 | 700 | 10000 |
| 10 Regalrez ™ 3102 | 53 | 305 | 700 | 10000 |
| 11 Foral 85 | 49 | 301 | 609 | 10000 |
| 12 Arakawa KE311 | 56 | 357 | 578 | 10000 |

The data in Table 3 show that pressure-sensitive adhesives having various tackifying resins along with a soluble chlorinated polyolefin will result in adhesion build when tested on a TPO surface.

EXAMPLE 13

A pressure-sensitive adhesive sheet material was prepared as in Example 1 except that a syrup was prepared by prepolymerizing a mixture having 60 parts butyl acrylate, 10 parts acrylic acid and 0.04 pph benzil dimethyl ketal. To the mixture was added 30 parts IOA, 5 pph Hardlen LP-16, 5 pph Hydrocarbon Tackifying Resin I, 0.1 pph 1,6-hexanedioldiacrylate, 0.1 pph triacrylate (OTA-480 from Radcure), 0.16 pph benzil dimethyl ketal, and the mixture was mixed on a roller mill for about 20 hours. Just prior to coating, 0.4 pph of a solution of $SnCl_2$/polypropylene glycol was added and mixed on the roller mill for 30 minutes. The coated mixture was coated between two transparent silicone coated polyester films and cured at intensities of 0.75 mW/cm$^2$ (G units) for 2.43 minutes, 1.6 mW/cm$^2$ for 2.43 minutes, and 2.8 mW/cm$^2$ for 2.44 minutes.

The sheet material was tested for peel adhesion and test results are shown in Table 4.

TABLE 4

| | Peel Adhesion - 30.48 cm/min - TPO - N/dm | | | Peel Adhesion - 1.27 cm/min - TPO - N/dm | | | Peel Adhesion - 30.48 cm/min - PP - N/dm | | |
|---|---|---|---|---|---|---|---|---|---|
| Ex | 20 min | 3 Day | 3 Day | 20 min | 3 Day | 3 Day | 20 min | 3 Day | 3 Day |
| | RT | RT | 70 C. | RT | RT | 70 C. | RT | RT | 70 C. |
| 13 | 81 | 301 | 497 | 119 | 277 | 305 | 70 | 235 | 466 |
| 13* | 263 | 417 | 543 | 149 | 294 | 368 | — | — | — |

*The TPO panels were tested with the pressure-sensitive adhesive sheet material of Example 13 except that the panels were wiped with heptane. The results show that wiping the panels with a nonpolar solvent can increase the peel adhesion values to a TPO surface.

EXAMPLES 14–16 AND COMPARATIVE EXAMPLE C5

A syrup was prepared by partially polymerizing a composition having 97 parts IOA, 3 parts AA, and 0.04 pph benzil dimethyl ketal as detailed in Example 1 and the composition was coated between two silicone coated transparent polyester films and cured. For Examples 14–16, the following were added: an additional 0.1 pph benzil dimethyl ketal, 0.1 pph 2,4-bis(trichloromethyl)-6-(4-methyoxyphenyl)-s-triazine, and 5 pph chlorinated polyolefin. The chlorinated polyolefins used were as follows: Example 14—15-LP; Example 15—16-LP; Example 16—17-LP. A pressure-sensitive adhesive transfer tape (0.28 mm thick) was prepared as described in Example 13. Comparative example C5 was prepared in the same manner except that no chlorinated polyolefin was used. Peel adhesion test samples using the pressure-sensitive adhesive transfer tapes were prepared as described above. One set of samples was aged at room temperature for 72 hours. A second set of identical samples were aged for 72 hours at room temperature, then heat aged at 120° C. for 1 hour and cooled to room temperature for 24 hours before testing. Test results are shown in Table 5.

TABLE 5

| | Peel Adhesion - 30.48 cm min - TPO - N/dm | | Static Shear - 70 C. - |
|---|---|---|---|
| Ex | 3 Day RT | 3 Day RT + Heat | 250 g weight - min |
| 14 | 64 | 82 | 10000 |
| 15 | 91 | 107 | 10000 |
| 16 | 91 | 97 | 10000 |
| C5 | 85 | 65 | 10000 |

EXAMPLES 17–21

Pressure-sensitive adhesive compositions and transfer tapes were prepared as in Example 1. In Example 17, the pressure-sensitive adhesive transfer tape was laminated to a polyurethane foam (545 foam from Norton Co.) that was coated as in Example 1. In Example 18, the tape was laminated to a 0.8 mm thick ethylene vinyl acetate modified polyethylene foam (0.096 g/cm$^3$) (Voltek polyethylene foam from Voltek) without the use of a priming system. In Example 19, the adhesive transfer tape was laminated to a 1.6 mm polyethylene foam (T-Cell™ crosslinked ethylene vinyl acetate modified polyethylene foam (0.064 g/cm$^3$), available from Sentinel Products Corp., without the use of a priming system. In Examples 20 and 21, the acrylic syrup composition was coated directly onto the foams of Examples 18 and 19, respectively, and cured as in Example 1. Test results are shown in Table 6.

TABLE 6

| | Peel Adhesion - TPO - 30.48 cm/min - N/dm | | | |
|---|---|---|---|---|
| Ex | 20 Sec RT | 20 Min RT | 3 Day RT | 70 C. |
| 17 | 28 | 35 | 126 | 249 |
| 18 | 56 | 63 | 74 | 228* |
| 19 | 84 | 126 | 217 | 217* |
| 20 | 39 | 39 | — | 179** |
| 21 | 18 | 39 | — | 112** |

*Aged for 3 days
**Aged for 1 day

Examples 17–21 illustrate the utility of the pressure-sensitive adhesives of the invention on various types of foam substrates.

It will be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

We claim:
1. A pressure sensitive adhesive composition comprising:
   (a) 50 to 100 parts by weight of at least one acrylic or methacrylic ester of a non-tertiary allyl alcohol in which the allyl group contains 4 to 20 carbon atoms;
   (b) 0 to 50 parts by weight of at least one reinforcing monomer, copolymerizable with component (a), the sum of (a) and (b) amounting to 100 parts by weight;
   (c) 0.1 to 15 parts by weight, per 100 parts by weight of the sum of components (a) and (b), of a chlorinated polyolefin selected from the group consisting of chlorinated polypropylene and chlorinated ethylene vinyl acetate, said chlorinated polyolefin characterized as being substantially soluble in the (a) and (b) components; and
   (d) a photoinitiator of a type and in an amount effective to polymerize said components (a) and (b),
   said adhesive composition being substantially solvent free.

2. The adhesive composition of claim 1, further comprising a tackifier.

3. The adhesive composition of claim 2, wherein said tackifier is selected from a hydrocarbon resin, a hydrogenated hydrocarbon resin, a phenol-modified terpene, poly(-t-butyl styrene), or a rosin ester.

4. The adhesive composition of claim 2, wherein said tackifier comprises a water white, hydrogenated resin produced from a hydrocarbon feedstock, said tackifier having:
   (i) a retained aromaticity on a weight percent of monomers in the feedstock basis of greater than 50 percent;
   (ii) a softening point of 65° to 120° C.;
   (iii) a Mz of less than 1800; and
   (iv) substantially no molecular weight fractions above 7000.

5. The adhesive composition of claim 4, wherein said tackifier has a retained aromaticity on a weight percent of monomers in the feedstock basis of 80 to 95 percent.

6. The adhesive composition of claim 4, wherein said tackifier has a softening point of 65° to 100° C.

7. The adhesive composition of claim 4, wherein the tackifier has a polydispersity of less than 2.5.

8. The adhesive composition of claim 2, wherein the adhesive composition comprises 1 to 50 parts by weight of the tackifier, per 100 parts by weight of the sum of components (a) and (b).

9. The adhesive composition of claim 2, wherein the adhesive composition comprises 4 to 25 parts by weight of the tackifier, per 100 parts by weight of the sum of components (a) and (b).

10. The adhesive composition of claim 2, wherein the tackifier has a Mz of from 700 to 1100.

11. The adhesive composition of claim 2, wherein tackifier is the tackifier described in Table 1—Hydrocarbon Tackifying Resin I Properties.

12. The adhesive composition of claim 1, wherein said substantially soluble chlorinated polyolefin is chlorinated polypropylene.

13. The adhesive composition of claim 3, wherein said substantially soluble chlorinated polyolefin is a chlorinated polypropylene having a chlorine content of 20 to 35%.

14. The adhesive composition of claim 1, wherein said chlorinated polyolefin is present in an amount of 0.1 to 10 parts by weight.

15. The adhesive composition of claim 1, wherein said at least one acrylic or methacrylic ester of a non-tertiary alkyl alcohol has an alkyl group containing 4 to 18 carbon atoms.

16. The adhesive composition of claim 1, wherein said adhesive composition is clear and essentially colorless.

17. The adhesive composition of claim 1, further comprising a polymerization initiator, of a type and in an amount effective to polymerize said components (a) and (b).

18. The adhesive composition of claim 1, wherein component (a) comprises at least one acrylic or methacrylic ester of a non-tertiary alkyl alcohol selected from n-butyl acrylate, n-hexyl acrylate, n-octyl acrylate, isooctyl acrylate, 2-ethylhexyl acrylate, isononyl acrylate, n-decyl acrylate, n-dodecyl acrylate, or octadecyl acrylate.

19. The adhesive composition of claim 1, wherein component (b) comprises at least one reinforcing monomer selected from acrylic acid, methacrylic acid, N-vinyl pyrrolidone, N-vinyl caprolactam, an N,N-dimethyl acrylamide, acrylonitrile, isobornyl acrylate, a $C_1$ to $C_3$ acrylate, or carboxyethyl acrylate.

20. The adhesive composition of claim 1, wherein component (b) comprises isobornyl acrylate and acrylic acid.

21. The adhesive composition of claim 1, further comprising a crosslinking agent.

22. A method for producing a pressure-sensitive adhesive comprising providing starting materials comprising:
(a) 50 to 100 parts by weight of at least one acrylic or methacrylic ester of a non-tertiary alkyl alcohol in which the alkyl group contains 2 to 20 carbon atoms;
(b) 0 to 50 parts by weight of at least one reinforcing monomer, copolymerizable with component (a), the sum of (a) and (b) amounting to 100 parts by weight; and
(c) 0.1 to 15 parts by weight, per 100 parts by weight of the sum of components (a) and (b), of a substantially soluble chlorinated polyolefin;
said starting materials being substantially solvent-free; and polymerizing said starting materials in a substantially solvent free process.

23. A method for producing a pressure sensitive adhesive comprising the steps of:
(a) providing a monomer composition comprising:
(i) 50 to 100 parts by weight of at least one acrylic or methacrylic ester of a non-tertiary alkyl alcohol in which the alkyl group contains 2 to 20 carbon atoms; and
(ii) 0 to 50 parts by weight of at least one reinforcing monomer copolymerizable with component (i), the sum of (i) and (ii) amounting to 100 parts by weight,
(b) optionally polymerizing said monomer composition to form a syrup;
(c) dissolving a substantially soluble chlorinated polyolefin selected from the group consisting of chlorinated polypropylene and chlorinated ethylene vinyl acetate in said monomer composition or said syrup to form a solution; and
(d) polymerizing said solution to form an adhesive, wherein the polymerization is performed by a substantially solvent-free process.

24. The method of claim 23 wherein the solution is polymerized by exposure to ultraviolet radiation.

25. A pressure sensitive adhesive prepared by the method of claim 23.

26. The pressure sensitive adhesive of claim 25 wherein component (i) comprises isooctyl acrylate and component (ii) comprises acrylic acid and isobornyl acrylate.

27. The pressure sensitive adhesive of claim 25 wherein component (i) comprises about 68 parts by weight isooctyl acrylate and component (ii) comprises about 4 parts by weight acrylic acid and about 28 parts by weight isobornyl acrylate.

28. A pressure sensitive adhesive prepared by the method of claim 24.

29. A pressure sensitive adhesive comprising the polymerization reaction products of an adhesive composition consisting essentially of the following components:
(a) 50 to 100 parts by weight of at least one acrylic or methacrylic ester of a non-tertiary alkyl alcohol in which the alkyl group contains 4 to 20 carbon atoms;
(b) 0 to 50 parts by weight of at least one reinforcing monomer, copolymerizable with component (a), the sum of (a) and (b) amounting to 100 parts by weight;
(c) 0.1 to 15 parts by weight, per 100 parts by weight of the sum of components (a) and (b), of a chlorinated polypropylene characterized as being substantially soluble in the (a) and (b) components;
(d) an effective amount of a free radical initiator;
(e) an effective amount of a crosslinking agent; and
(f) optionally, a tackifier,
said adhesive composition being substantially solvent free and wherein (i) said pressure sensitive adhesive exhibits adhesion build to a thermoplastic olefin surface at 70° C. and (ii) the polymerization is performed by a substantially solvent-free process.

30. The pressure sensitive adhesive of claim 29 wherein the free radical initiator is a photoinitiator.

* * * * *

UNITED STATES PATENT AND TRADEMARK OFFICE
CERTIFICATE OF CORRECTION

PATENT NO.: 5,840,783

DATED: November 24, 1998

INVENTOR(S): Bradley S. Momchilovich, et al.

It is certified that error appears in the above-identified patent and that said Letters Patent is hereby corrected as shown below:

Column 16, line 11, "allyl" should be --alkyl--;

Column 16, line 12, "allyl" should be --alkyl--.

Signed and Sealed this

Sixth Day of April, 1999

Q. TODD DICKINSON

Attest:

Attesting Officer

Acting Commissioner of Patents and Trademarks